(12) United States Patent
Applin et al.

(10) Patent No.: US 7,143,395 B2
(45) Date of Patent: Nov. 28, 2006

(54) VERIFYING A PROGRAM VERSION

(75) Inventors: John R. Applin, Fort Collins, CO (US); Richard Ferreri, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 592 days.

(21) Appl. No.: 10/074,030

(22) Filed: Feb. 14, 2002

(65) Prior Publication Data

US 2003/0154470 A1    Aug. 14, 2003

(51) Int. Cl.
*G06F 9/44* (2006.01)

(52) U.S. Cl. ...................................................... 717/130

(58) Field of Classification Search ................ 717/120, 717/122, 170, 100, 159; 707/203; 715/511
See application file for complete search history.

(56) References Cited

U.S. PATENT DOCUMENTS

| | | | | |
|---|---|---|---|---|
| 4,558,413 A | * | 12/1985 | Schmidt et al. | 707/203 |
| 5,649,200 A | * | 7/1997 | Leblang et al. | 717/122 |
| 5,805,899 A | * | 9/1998 | Evans et al. | 717/170 |
| 5,991,774 A | * | 11/1999 | Tate et al. | 707/203 |
| 6,230,318 B1 | | 5/2001 | Halstead et al. | 717/10 |
| 6,560,620 B1 | * | 5/2003 | Ching | 715/511 |
| 2001/0052108 A1 | * | 12/2001 | Bowman-Amuah | 717/1 |

\* cited by examiner

*Primary Examiner*—Kakali Chaki
*Assistant Examiner*—Tuan A. Vu

(57) ABSTRACT

A version for each of a plurality of object files in a computer program is verified by identifying a version of an object file of the plurality of object files in the computer program and comparing the identified version to an initial version. In response to the identified version being different than the initial version, an alert is generated.

20 Claims, 4 Drawing Sheets

VERIFYING A PROGRAM VERSION

FIELD OF THE INVENTION

The invention is generally related to computer programs. More particularly, the invention is related to verifying a program version.

BACKGROUND OF THE INVENTION

It is generally recognized that computers are pervasive throughout the vast majority of American society and business. It is also generally known that computers typically utilize code (i.e., machine code) in the form of software or firmware to process data and perform a myriad of function that computers are used for today. Typically, computer programmers utilize a computer language to generate code. Today, there are a multitude of computer languages available in a variety of broadly defined classifications. One such classification of computer languages is object-oriented languages ("OOLs") which are used to create object-oriented programs ("OOPs").

Generally, object-oriented programming encompasses a group of programming languages and techniques based on the concept of an "object". An object is defined by a set of routines, called "methods". For example, an object of a certain class may be configured to perform actions, e.g., printing data generated by the object, creating a new instance of itself, etc. Each object operates as a separate independent piece or module of an application. Additionally, each object has its own values for the variables belonging to its class. Operations performed upon the variables can only be performed by the methods of a particular class of objects. Thus, the interface between objects is well defined.

The methods serve as an interface for a class or family of objects. Classes may be defined by a position in a "class hierarchy". Methods or code in one class may be passed down the hierarchy to a subclass or inherited from a superclass in a structure called "inheritance". In this regard, many modem OOLs include an extensive object library of pre-made classes and a programming environment to facilitate application construction. This suite of applications, header files, object libraries, etc. is described as a software developer's kit ("SDK") or program developer's kit ("PDK").

While the structure of the OOLs and various structured languages, such as C, allows for exquisite and elegant control of data and memory resources, it does have a number of disadvantages. One particular disadvantage is that if an application is created utilizing more than one version of an SDK, the application may generate errors that are difficult to interpret. For example, if two modules of an application are created by programmers utilizing different versions of a given SDK, relatively minor corruptions (e.g., corruptions that do not cause an immediate fault) of data may occur. These "minor" problems may accumulate for some time until they cause a fault or are otherwise noticed.

SUMMARY OF THE INVENTION

In one respect, the invention pertains to a method for verifying a version for each of a plurality of object files in a computer program. In this method, a version of an object file of the plurality of object files used in the computer program is identified and the identified version is compared with an initial version. In response to the identified version being different than the initial version, an alert is generated.

BRIEF DESCRIPTION OF THE DRAWINGS

The an embodiment of the invention is illustrated by way of example and not limitation in the accompanying figures in which like numeral references refer to like elements, and wherein.

DETAILED DESCRIPTION OF AN EMBODIMENT

For simplicity and illustrative purposes, the principles of the invention are described by referring mainly to an exemplary embodiment thereof, particularly with references to a system to verify the respective versions of a plurality of objects within a computer program. However, one of ordinary skill in the art would readily recognize that the same principles are equally applicable to, and may be implemented in, a system capable of verifying a variety of aspects related to computer software and/or firmware, and that any such variations are within the scope of the invention. While in the following description numerous specific details are set forth in order to provide a thorough understanding of an embodiment of the invention, in other instances, well known methods and structures have not been described in detail so as not to obscure the invention.

Figure 1:
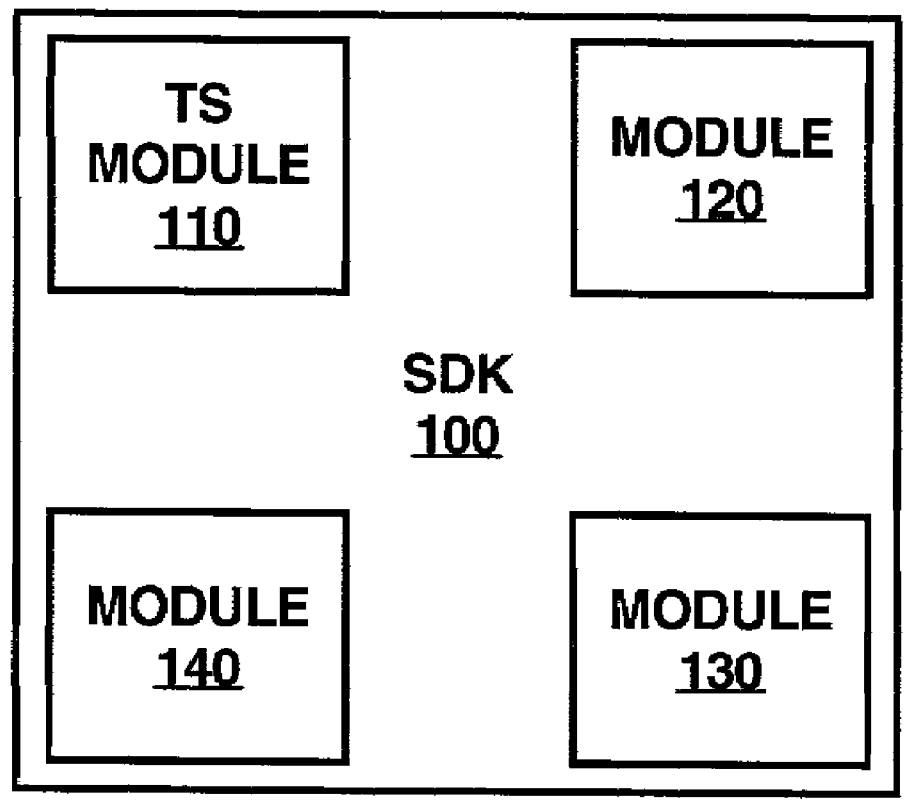
FIG. 1 is an exemplary block diagram of an SDK.

FIG. 1 is a block diagram of an SDK 100 according to an embodiment of the invention. The SDK 100 may include various applications and modules, such as object libraries, header files, and the like to facilitate the creation of a computer application. In this regard, the SDK 100 may include a time stamp ("TS") module 110 and a plurality of additional modules 120–140 for performing various tasks determined by the programmers. While four modules are depicted in FIG. 1, it will be apparent to those skilled in the art that the SDK 100 may include any reasonable number of modules. In one embodiment, the SDK 100 may utilize any object oriented programming methodology such as Java and C++ languages. However, those skilled in the art will appreciate that an embodiment of the invention may also be implemented utilizing other known or future programming methodology.

The SDK 100 may serve as a programming interface configured to facilitate the use of the various modules 110–140. In particular, the SDK 100 may be configured to facilitate the use of the TS module 110. The TS module 110 may be configured to embed a time stamp within objects generated by the SDK 100. As described in greater detail below, the time stamp may be utilized to verify that objects within an application have been generated by the same version of the SDK 100.

In one embodiment, the functionality of the TS module 110 may be included within a header file. In general, a header file may be utilized to define functions, classes, and include predefined functions. A method of defining a macro (which defines a symbolic constant) within a header file is to invoke a preprocessor textual macro substitution using a "#define" command. The preprocessor is a program invoked by various compilers to process code before compilation. In addition to textual macro substitution, the preprocessor performs conditional compilation and inclusion of other files.

Table 1 is an exemplary header file "TimeStamp.h" according to an embodiment of the invention.

TABLE 1

```
1    #ifndef TimeStamp_h
2    #define Timestamp_h
3    #define PIKA_TIMESTAMP 1010382108
4    #define PIKA_HOWBUILT "built Mon Jan 07 12:41:48 2002 by
Jack Applin on device x"
5    #endif /* TimeStamp_h */
```

As shown in Table 1, the TimeStamp.h may be used to define a "PIKA_TIMESTAMP" macro. In this regard, as seen in line 3 (line numbers added for clarity) PIKA_TIMESTAMP is defined as the value "1010382108". In one embodiment, this value represents the date and time a given SDK is built and is utilized to uniquely identify a particular version (e.g., build date) for the given SDK. In turn, this SDK version identifier may be incorporated within each object created by the SDK. However, it should be apparent to those skilled in the art that various other manner of identifying a particular version may be utilized and are thus within the scope of the invention.

Additionally, the TimeStamp.h may be used to define a "PIKA_HOWBUILT" macro. In this regard, as seen in line 4 PIKA_HOWBUILT is defined as "built Mon Jan 07 12:41:48 2002 by Jack Applin on device x". The device x is the name or identifying address of the computer used by a programmer of the SDK (i.e., Jack Applin) to build the given version of the SDK. While not essential to this embodiment of the invention, the PIKA_HOWBUILT macro may be utilized to generate a user friendly message with regard to the cause of an error.

Furthermore, to ensure that the macros PIKA_TIMESTAMP and PIKA_HOWBUILT are defined only once during the compilation of any particular object file, the #define statements are placed within a set of conditional operators. Thus, during precompilation, the preprocessor parses line 1, if "TimeStamp_h" has been defined, the preprocessor ignores lines 2, 3, and 4. However, if TimeStamp_h has not been defined, the following actions may be performed:

The preprocessor parses line 2 and defines TimeStamp_h.

The preprocessor parses line 3, defines PIKA_TIMESTAMP as 1010382108 and replaces all instances of PIKA_TIMESTAMP with 1010382108 within all code included in the particular compilation session.

The preprocessor parses line 4, defines PIKA_HOWBUILT as "built Mon Jan 07 12:41:48 2002 by Jack Applin on device x" and replaces all instances of PIKA_HOWBUILT with "built Mon Jan 07 12:41:48 2002 by Jack Applin on device x" within all code included in the particular compilation session.

Additionally, it is to be understood that the invention is not limited to the exemplary header file listed in Table 1, but rather, the invention may include any reasonable variation of computer code and/or machine language capable of performing a similar process. Accordingly, the header file listed in Table 1 is for illustrative purposes only and thus is not meant to limit the present invention in any respect. For example, while the header file listed in Table 1 describes the use of two identifiers (e.g., PIKA_TIMESTAMP and PIKA_HOWBUILT) various other embodiments of the invention may utilize a single identifier or multiple identifiers and are thus within the scope of the invention.

Table 2 is an exemplary header file Pika.h according to an embodiment of the invention.

TLBLE 2

```
10    class CheckVersion {
11        public:
12            CheckVersion(time_t, const char *msg);
13        private:
14            static time_t saved_time;
15            static const char *saved_msg;
16    };
17    static const CheckVersion cv(PIKA_TIMESTAMP,
          PIKA_HOWBUILT);
```

Note that in line 17, the word 'static' implies that 'CheckVersion' is local to this compilation object, and so, multiple instances of this object can exist in other compilation units. In this manner, a respective version for each object may be maintained. As described below, these respective versions may be compared and version discrepancies may be detected.

The Pika.h file may be utilized to define and instantiate an object class. Definition of a class refers to naming and defining characteristics of that class. Instantiation of an object refers to the initialization of the variables and other values that comprise the state of the object.

In this regard, an object "CheckVersion" is defined in lines 10–16 and instantiated in line 17.

Additionally, it is to be understood that the invention is not limited to the exemplary header file listed in Table 2, but rather, the invention may include any reasonable variation of computer code and/or machine language capable of performing a similar process. Accordingly, the header file listed in Table 2 is for illustrative purposes only and thus is not meant to limit the present invention in any respect. For example, while the header file listed in Table 2 describes the use of two identifiers (e.g., time_t and msg) various other embodiments of the invention may utilize a single identifier or multiple identifiers and are thus within the scope of the invention.

Table 3 is an exemplary class constructor file Pika.cc according to an embodiment of the invention.

TABLE 3

```
20    time_t CheckVersion::saved_time;
21    const char *CheckVersion::saved_msg;
22    CheckVersion::CheckVersion(time_t time, const char *msg) {
23        if (saved_msg == 0) {
24            saved_time = time;
25            saved_msg = msg;
26        }
27        else if (time != saved_time) {
28            cerr << "Error: Version mismatch -- use of different
```

TABLE 3-continued

```
versions of                          Pika:\n           "
29                                   << saved_msg << "\nand:\n " << msg <<
                                     "\n";
30                    exit(1);
31              }
32        }
```

The file Pika.cc may be utilized to construct a CheckVersion object class. In one embodiment, the CheckVersion constructor may be initiated at run time for an application such as the application 240 that includes a plurality of objects. In this regard, as each of the plurality of objects is initiated, the instructions within the file Pika.cc are performed. As a first object is initiated, the saved_time and the saved_msg variables are initiated with a time and a msg value from the first object (e.g., the first object's respective version). As a subsequent CheckVersion object is constructed, the subsequent object's associated time value (e.g., the subsequent object's version) may be compared to the saved_time value. If these values are the same (e.g., saved_time=time), the application may proceed. However, if the value of saved_time does not equal the value of time, an error state may occur. In this regard and as illustrated in lines 29 and 30, the values of the saved_msg and the msg may be displayed, an error message, "Error: Version mismatch-..." may be displayed and the application 240 may end.

Additionally, it is to be understood that the invention is not limited to the exemplary class constructor file listed in Table 3, but rather, the invention may include any reasonable variation of computer code and/or machine language capable of performing a similar process. Accordingly, the class constructor file listed in Table 3 is for illustrative purposes only and thus is not meant to limit the present invention in any respect. For example, while the class constructor listed in Table 3 describes the use of two identifiers (e.g., time_t and msg) various other embodiments of the invention may utilize a single identifier or multiple identifiers and are thus within the scope of the invention.

Figure 2:
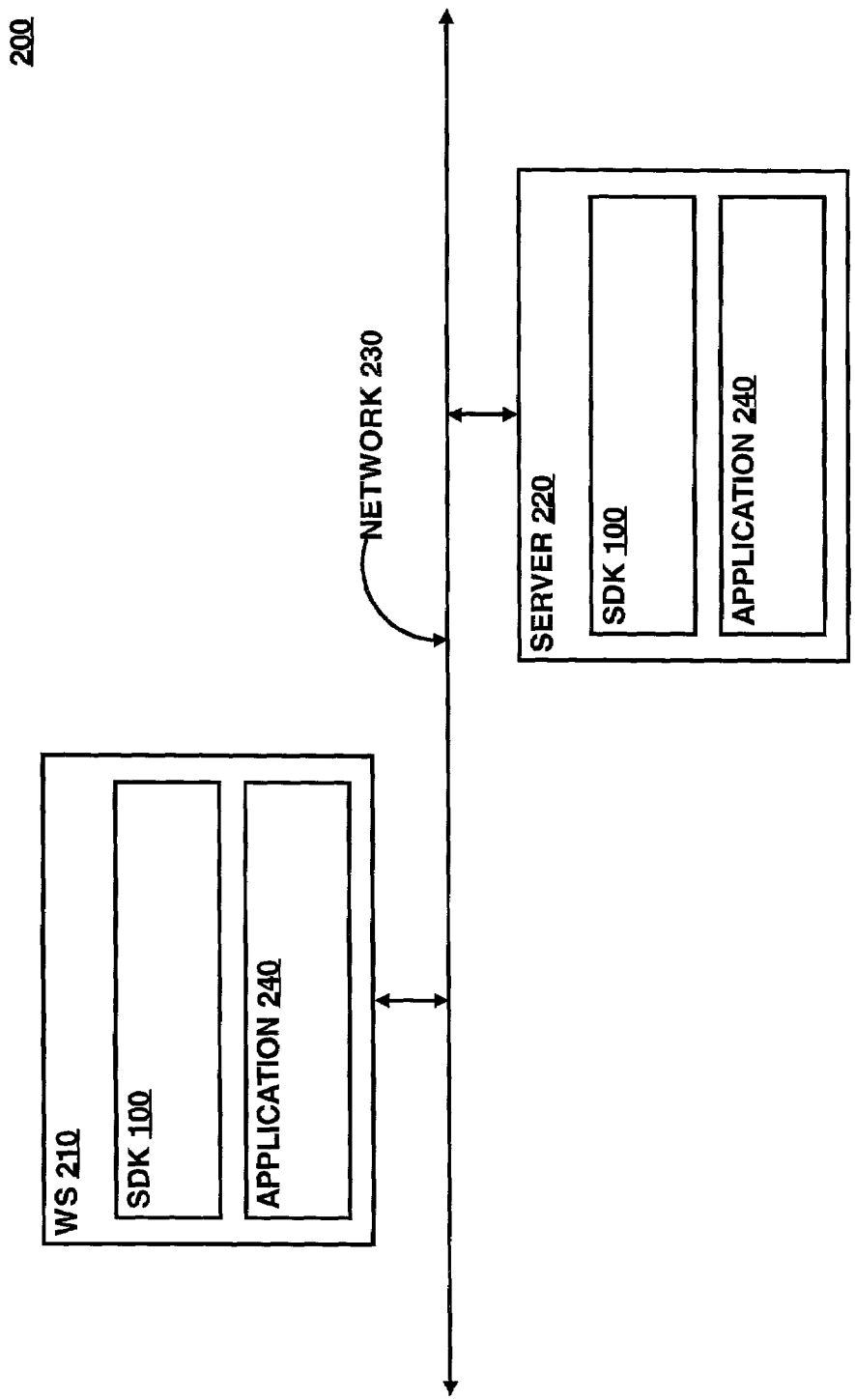
FIG. 2 is a block diagram illustrating an exemplary computing environment in which an embodiment of the invention may be practiced.

FIG. 2 is a block diagram illustrating an exemplary environment 200 according to an embodiment of the invention. As shown in FIG. 2, the environment 200 may include a workstation ("WS") 210, a server 220 and a network 230.

The WS 210 may be configured to at least provide the capability of known workstations. In this regard, the WS 210 may be a computer such as the HP Visualize C3600, HP vectra vl800, Apple Macintosh computer or UNIX based workstation. The WS 210 may further be configured to operate the SDK 100 and an application 240. The WS 210 may include an operating system such as the Microsoft Windows NT or Windows2000 Operating System ("OS"), the IBM OS/2, the MAC OS, or UNIX OS. Those skilled in the art will appreciate that an embodiment of the invention may also be implemented on platforms and operating systems other than those mentioned.

The server 220 may be configured to at least provide the capability of known servers. In this regard, the server 220 may be a computer such as the HP 1p2000r, the HP9000 and the like. The server 220 may further be configured to operate SDK 100 and/or the application 240. The server 220 may include an operating system such as the Microsoft Windows NT or Windows2000 OS, the IBM OS/2, the MAC OS, or UNIX OS. Those skilled in the art will appreciate that an embodiment of the invention may also be implemented on platforms and operating systems other than those mentioned.

The application 240 may be created using the SDK 100. In a manner similar to known applications, the application 240 may include computer code configured in a plurality of modules or objects. In one embodiment, the SDK 100 and/or the application 240 operating on the server 220 may be different instances of the same SDK 100 and/or the application 240 operating on the WS 210. In another embodiment, the SDK 100 and/or the application 240 operating on the server 220 may be different versions of the SDK 100 and/or the application 240 operating on the WS 210. In yet another embodiment, the functionality of one instance of the SDK 100 and/or the application 240 may be distributed across the network 230. Furthermore, the term application is not meant to be a limitation, but rather, describes any computer software and/or firmware capable of performing manipulations of computer data.

Although not illustrated, the environment 200 may also include any reasonable number of additional components, e.g., clients, workstations, servers, printer spoolers, repeaters, hubs, bridges, routers, etc. The network 230 may be configured to provide a communication path for one or more network devices to communicate with one or more other network devices. The network 230 may be configured to operate over the Internet, public switched telephone network, a local area network or the like. Furthermore, it is within the scope of the invention that some or all of the functionality of the environment 200 may be subsumed within a single device. Accordingly, the environment 200 described is for illustrative purposes only and thus not meant to limit the invention in any respect.

Figure 3:
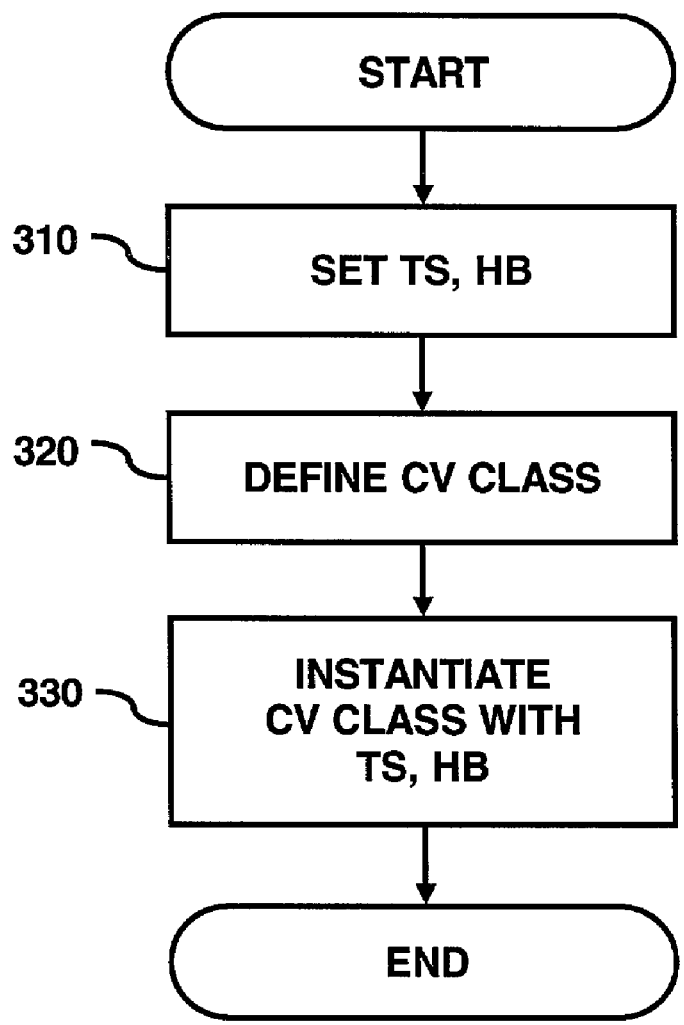
FIG. 3 is a flow diagram of a method according to an embodiment of the invention.

FIG. 3 is a flow diagram of a method 300 for setting and incorporating a time stamp function within a plurality of objects in an SDK according to an embodiment of the invention. The following description of FIG. 3 will be made with particular reference to the SDK 100 described in FIG. 1 and the computer environment described in FIG. 2. Accordingly, one or more aspects of the method 300 may be initiated during development of the SDK 100. As shown in FIG. 3, at step 310, a time stamp ("TS") value, such as the PIKA_TIMESTAMP described in Table 1, may be set for a particular version of the SDK 100. In one embodiment, the TS value is defined at the time the SDK 100 is created. In this regard, and as shown in Table 1, the TS value may be set. Additionally, a how built ("HB") string, such as the PIKA_HOWBUILT string described in Table 1, may be set for the particular version of the SDK 100. The HB string may be utilized to facilitate the display of a user friendly error message as described in greater detail below. In a manner similar to the TS value, in one embodiment, the HB string may be defined at the time the SDK 100 is created.

At step 320, a CheckVersion ("CV") class such as the CheckVersion class described in Table 2 is defined. In general, defining the CV class may be utilized to configure one or more variables and or constants within the CV class. In one embodiment, the CV class is defined using a predefined header file from the SDK 100. Additionally, the predefined header file from the SDK 100 may be a header file that is referenced by essentially every object file generated with the SDK 100.

At step 330, one or more of the variables and/or constants of the CV class may be defined. In one embodiment, the definition is performed utilizing the preprocessor textual macro substitution described in Table 1. Additionally, one or more of the variables and/or constants of the CV class may be defined with the HB value in a manner similar to the TS value.

Additionally, it is to be understood that the invention is not limited to the method 300, but rather, the invention may include any reasonable variation of computer code and/or machine language capable of performing a similar process. Accordingly, the method is for illustrative purposes only and thus is not meant to limit the present invention in any respect. For example, while the method 300 describes the use of two identifiers (e.g., TS and HB) various other embodiments of the invention may utilize a single identifier or multiple identifiers and are thus within the scope of the invention. Furthermore, while the method 300 has been described with reference to the C++ code language, various other embodiments of the invention may utilize any present or future computer language.

Figure 4:
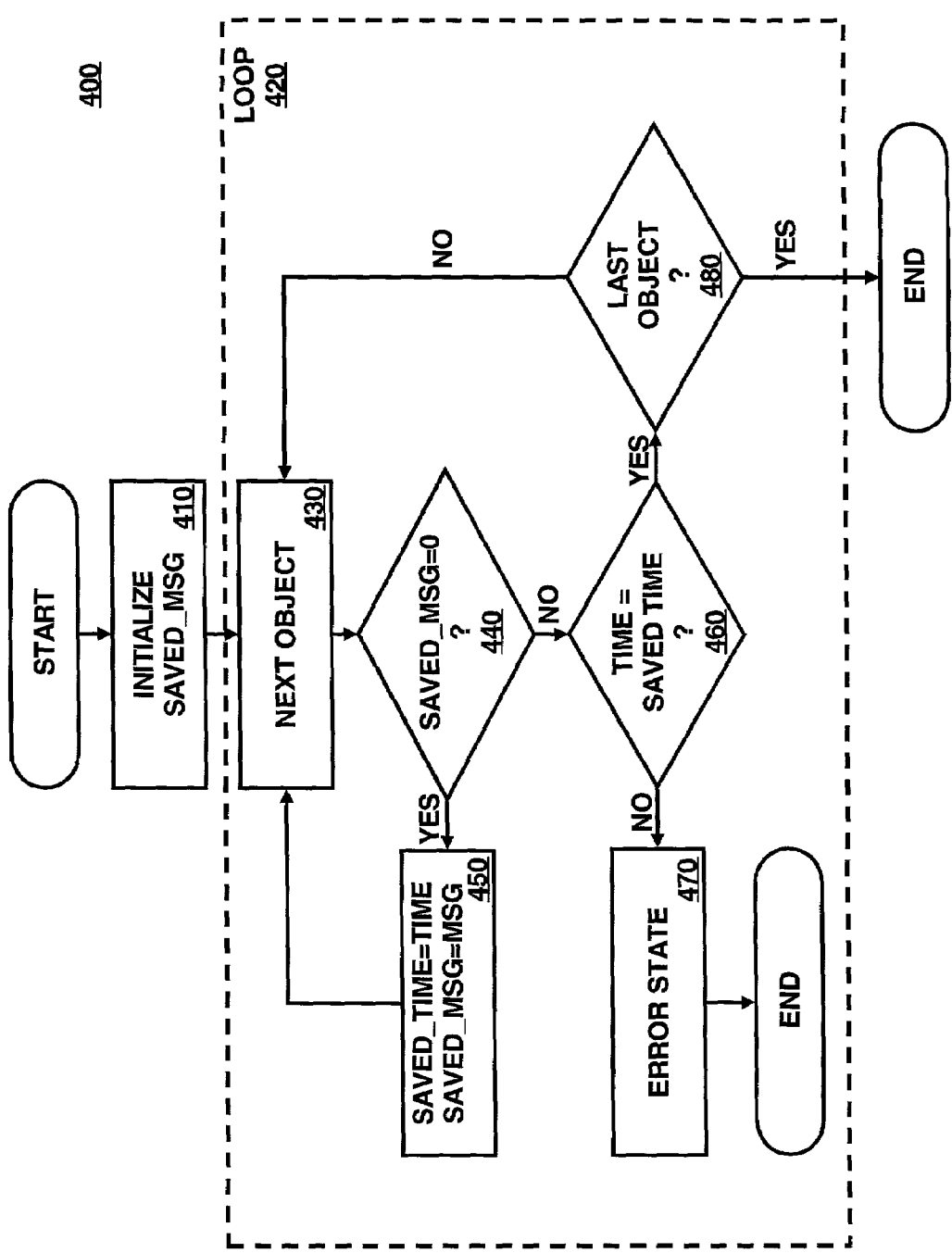
FIG. 4 is a flow diagram of a method according to an embodiment of the invention.

FIG. 4 is a flow diagram of a method 400 for verifying that a plurality of objects within an application have been generated using a single version of an SDK according to an embodiment of the invention. The following description of FIG. 4 will be made with particular reference to FIGS. 1 and 2 and the exemplary class constructor file Pika.cc, described in Table 3. Accordingly, in response to the initiation of the application 240, the method 400 may be initiated.

At step 410, SAVED_MSG is implicitly initialized to a know state e.g., 0, null, etc. Following the step 410, a loop 420 is performed. Generally, a set of instructions such as, the instructions described in Table 3, are performed during each pass through the loop 420. In this manner, one pass through the loop 420 is performed for every object that contains an instantiation of CheckVersion unless an error is detected or until all such objects have been verified.

At step 430, an object is referenced. In one embodiment of the method 400, a "time" and a "msg" variable are respectively utilized to store the TS value and the HB string of this object (e.g., the object's respective version) in a manner similar to in line 22 of Table 3. However, in various other embodiments, a single time stamp variable may be utilized. Additionally, as is well known to those having ordinary skill in the art, the term "time stamp" is not intended to be a limitation, but rather, describes the manner in which a unique identifier for each SDK version may be incorporated into each object created by the SDK.

At step 440, it is determined if the object referenced at step 430 is the first referenced object. For example, if SAVED_MSG=0, it may be determined that the object referenced at step 430 is the first referenced object and the method may proceed to step 450. Alternatively, if it is determined the object referenced at step 430 is not the first referenced object, the method 400 may proceed to step 460.

At step 450, the TS value for the object is assigned to a reference variable. For example, in line 24 of Table 3, the value of the variable "time" is assigned to the variable "saved_time". Additionally, the HB string for the object may be assigned to a reference variable in a manner similar the TS value. Following the step 450, the method 400 may return to step 430.

At step 460, the value stored to the "time" variable is compared to the value stored to the "saved_time" variable.

For example, in line 27 of Table 3 if time is not equal to saved_time, an error protocol in lines 28 to 30 may be performed. Thus, if the value stored to the "time" variable is not equal to the value stored to the "saved_time" variable, the method 400 proceeds to step 470. However, if the value stored to the "time" variable is equal to the value stored to the "saved_time" variable, the method 400 proceeds to step 480.

At step 470, in response to the TS values of two object being different, an alert or error state is initiated. In one embodiment, an informative message explaining the cause of the error state may be displayed to facilitate the correction of the problem. For example, in line 28 of Table 3, the message "Error: use of different versions of Pika:" followed by the HB string of the first object and the HB string of the object generated with the different version of Pika. Following the display of the error message, the method 400 may end.

At step 480, it may be determined if the current object is the last object. For example, if no further objects remain to be verified, the method 400 may end. Alternatively, if additional objects are to be verified, the method 400 may return to step 430 and another loop 420 may be performed.

Additionally, it is to be understood that the invention is not limited to the method 400, but rather, the invention may include any reasonable variation of computer code and/or machine language capable of performing a similar process. Accordingly, the method is for illustrative purposes only and thus is not meant to limit the present invention in any respect. For example, while the method 400 describes the use of two identifiers (e.g., TS and HB) various other embodiments of the invention may utilize a single identifier or multiple identifiers and are thus within the scope of the invention. Furthermore, while the method 400 has been described with reference to the C++ code language, various other embodiments of the invention may utilize any present or future computer language.

The methods 300 and 400 may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Exemplary computer readable signals, whether modulated using a carrier or not, are signals that a computer system hosting or running the computer program may be configured to access, including signals downloaded through the Internet or other networks. Concrete examples of the foregoing include distribution of the program(s) on a CD ROM or via Internet download. In a sense, the Internet itself, as an abstract entity, is a computer readable medium. The same is true of computer networks in general.

What has been described and illustrated herein is an embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for verifying a version for each of a plurality of object code files in a computer program at runtime, the method comprising steps of:
    defining a version checking object that is configured to include a dynamically referred to version for the object code file into the version checking object using a pre-processor prior to compilation;
    instantiating a copy of the version checking object at runtime within the object code files;
    storing the version for the object code file in the version checking object when the version checking object is instantiated;
    identifying a version stored in the version checking object of a selected object code file of the plurality of object code files included in the computer program;
    comparing the version of the selected object code file with a version of each of the remaining object code files of the plurality of object code files when the computer program is executed; and
    generating an alert in response to the version of the selected object code file being different than one or more versions of the remaining object code files.

2. The method of claim 1, wherein each of the plurality of object code files includes a respective version related to one or more software developer's kits used to create each of the plurality of object code files.

3. The method of claim 1, wherein the step of identifying a version of a selected object code file further comprises the step of storing the version of the selected object code file as a variable.

4. The method of claim 3, wherein the step of comparing further comprises comparing the version of each of the remaining object code files with a value of the variable.

5. The method of claim 1, wherein the step of generating an alert further comprises displaying a message to a user informing the user of a version mismatch.

6. The method of claim 1, wherein the version comprises at least one of a code version, a date and a time stamp.

7. The method of claim 1, wherein each of the plurality of object code files includes a respective textual message and the method further comprises the step of:
    displaying the textual message for the object code file in response to the version of the selected object code file being different than the version of one or more of the remaining object code files.

8. The method of claim 7, further comprising the steps of:
    storing the respective textual message of one of the plurality of object code files as an initial textual message in response to determining the initial textual message equals a null value; and
    displaying the initial textual message in response to the version of the selected object code file being different than the version of the remaining object code files.

9. A computer readable medium on which is embedded a program, the program performing a method for verifying a version for each of a plurality of object code files in a computer program, comprising computer readable program code for:
    defining a version checking object that is configured to include a dynamically referred to version for the object code file into the version checking object using a pre-processor prior to compilation;
    instantiating a copy of the version checking object at runtime for the object code files;
    storing the version of the object code file in the version checking object when the version checking object is instantiated;
    identifying a version that is stored in the version checking object of a selected object code file of the plurality of object code files included in the computer program;
    comparing the version of the selected object code file with a version of each of the remaining object code files of the plurality of object code files when the computer program is executed; and
    generating an alert in response to the version of the selected object code file being different than the one or more versions of the remaining object code files.

10. The computer readable medium of claim 9, wherein each of the plurality of object code files includes a respective version related to one or more software developer kits used to create each of the plurality of object code files.

11. The computer readable medium of claim 9, the step of identifying a version of a selected object code file further comprises the step of storing the version of the selected object code file as a variable.

12. The computer readable medium of claim 11, wherein the step of comparing further comprises comparing the version of each of the remaining object code files with a value of the variable.

13. The computer readable medium of claim 9 wherein the step of generating an alert further comprises displaying a message to a user informing the user of a version mismatch.

14. The computer readable medium of claim 9, wherein the version comprises at least one of a code version, a date and a time stamp.

15. The computer readable medium of claim 9 wherein each of the plurality of object code files includes a respective textual message and the method further comprises the step of:
    displaying the textual message for the object code file in response to the version of the selected object code file being different than the version of one or more of the remaining object code files.

16. The computer readable medium of claim 9, further comprising the steps of:
    storing the respective textual message of one of the plurality of object code files as an initial textual message in response to determining the initial textual message equals a null value; and
    displaying the initial textual message in response to the version of the selected object code file being different than the version of the remaining object code files.

17. An computer-implemented apparatus comprising:
    means for defining a version checking object that is configured to include a dynamically referred to version of the object code file into the version checking object using a pre-processor prior to compilation;
    means for instantiating a copy of the version checking object at runtime for the object code files;
    means for storing the version of the object code file in the version checking object when the version checking object is instantiated;
    means for identifying a version that is stored in the version checking object of a selected object code file of a plurality of object code files included in a computer program;
    means for comparing the version of the selected object code file with a version of each of the remaining object code files of the plurality of object code files when the computer program is executed; and means for generating an alert in response to the version of the selected object code file being different than one or more versions of the remaining object code files.

18. The apparatus of claim 17, wherein each of the plurality of object code files includes a respective version related to one or more software developer kits used to create each of the plurality of object code files.

19. The apparatus of claim 17, further comprising a means for displaying a message to a user informing the user of a version mismatch in response to the version of the selected object code file being different than the one or more versions of the remaining object code files.

20. The apparatus of claim 17 further comprising a means for encoding a respective version within each of the plurality of object code files, the respective version including at least one of a code version, a date and a time stamp.

* * * * *